US012606195B2

(12) United States Patent
Gillespie et al.

(10) Patent No.: US 12,606,195 B2
(45) Date of Patent: Apr. 21, 2026

(54) TECHNIQUES FOR GENERATING MAP REFERENCE PRIORS FOR AN AUTONOMOUS VEHICLE PLANNING STACK

(71) Applicant: GM Cruise Holdings LLC, San Francisco, CA (US)

(72) Inventors: Jonathon Gillespie, San Francisco, CA (US); Nishant Sharma, Hayward, CA (US); Joseph Sadusk, San Francisco, CA (US); Bradley Perry, Oakland, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 612 days.

(21) Appl. No.: 17/879,765

(22) Filed: Aug. 2, 2022

(65) Prior Publication Data

US 2024/0043032 A1     Feb. 8, 2024

(51) Int. Cl.
| | |
|---|---|
| *B60W 60/00* | (2020.01) |
| *B60W 40/09* | (2012.01) |
| *G01C 21/34* | (2006.01) |

(52) U.S. Cl.
CPC .......... *B60W 60/001* (2020.02); *B60W 40/09* (2013.01); *G01C 21/3461* (2013.01); *B60W 2554/4049* (2020.02)

(58) Field of Classification Search
None
See application file for complete search history.

(56) References Cited

U.S. PATENT DOCUMENTS

| | | | |
|---|---|---|---|
| 2018/0088571 A1* | 3/2018 | Weinstein-Raun | .......................... G05D 1/0088 |
| 2018/0173733 A1* | 6/2018 | Nath | ...................... G06N 5/025 |
| 2024/0029568 A1* | 1/2024 | Ramamurthy ... | G08G 1/096783 |

* cited by examiner

*Primary Examiner* — Hongye Liang
(74) *Attorney, Agent, or Firm* — Honigman LLP; Matthew H. Szalach; Jonathan P. O'Brien

(57) ABSTRACT

A method for providing a reference prior for a portion of a route to a planning stack of a vehicle. The method includes accessing manual driving data associated with the route portion, the manual driving data stored in a database; averaging the accessed manual driving data to determine a nominal path for the route portion; and providing the nominal path to the planning stack of the vehicle as the reference prior for the route portion, wherein the planning stack consumes the reference prior for planning maneuvers of the vehicle in traversing the route portion.

9 Claims, 11 Drawing Sheets

302

200

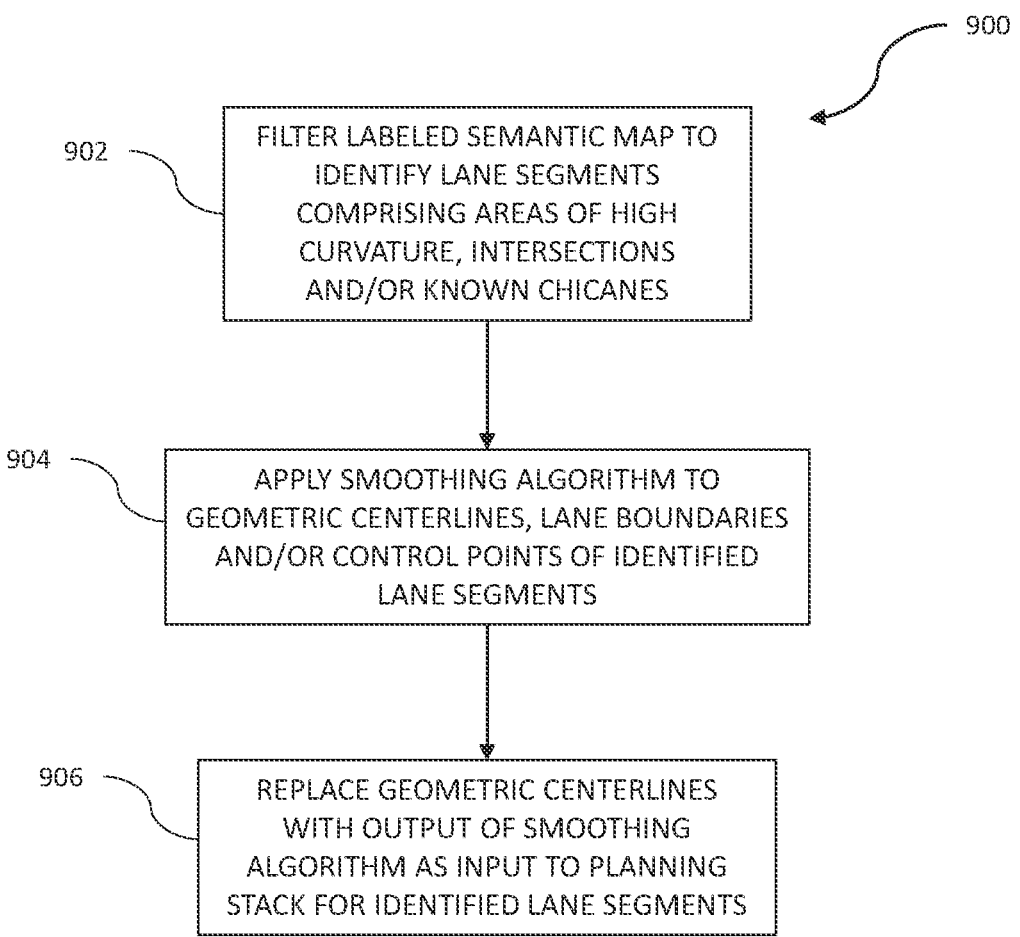

900

902 — FILTER LABELED SEMANTIC MAP TO IDENTIFY LANE SEGMENTS COMPRISING AREAS OF HIGH CURVATURE, INTERSECTIONS AND/OR KNOWN CHICANES

904 — APPLY SMOOTHING ALGORITHM TO GEOMETRIC CENTERLINES, LANE BOUNDARIES AND/OR CONTROL POINTS OF IDENTIFIED LANE SEGMENTS

906 — REPLACE GEOMETRIC CENTERLINES WITH OUTPUT OF SMOOTHING ALGORITHM AS INPUT TO PLANNING STACK FOR IDENTIFIED LANE SEGMENTS

FIG. 9

TECHNIQUES FOR GENERATING MAP REFERENCE PRIORS FOR AN AUTONOMOUS VEHICLE PLANNING STACK

BACKGROUND

Technical Field

The present disclosure relates generally to autonomous vehicles (AVs) and, more specifically, to techniques for generating map reference priors for an AV planning stack.

Introduction

An AV is a motorized vehicle that can navigate without a human driver. An exemplary AV can include various sensors, such as a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 9 is a flowchart illustrating example operations for algorithmically determining nominal reference paths for use by a planning stack of an AV using labeled semantic map data, according to some aspects of the disclosed technology.

DETAILED DESCRIPTION

Overview

Figure 1:
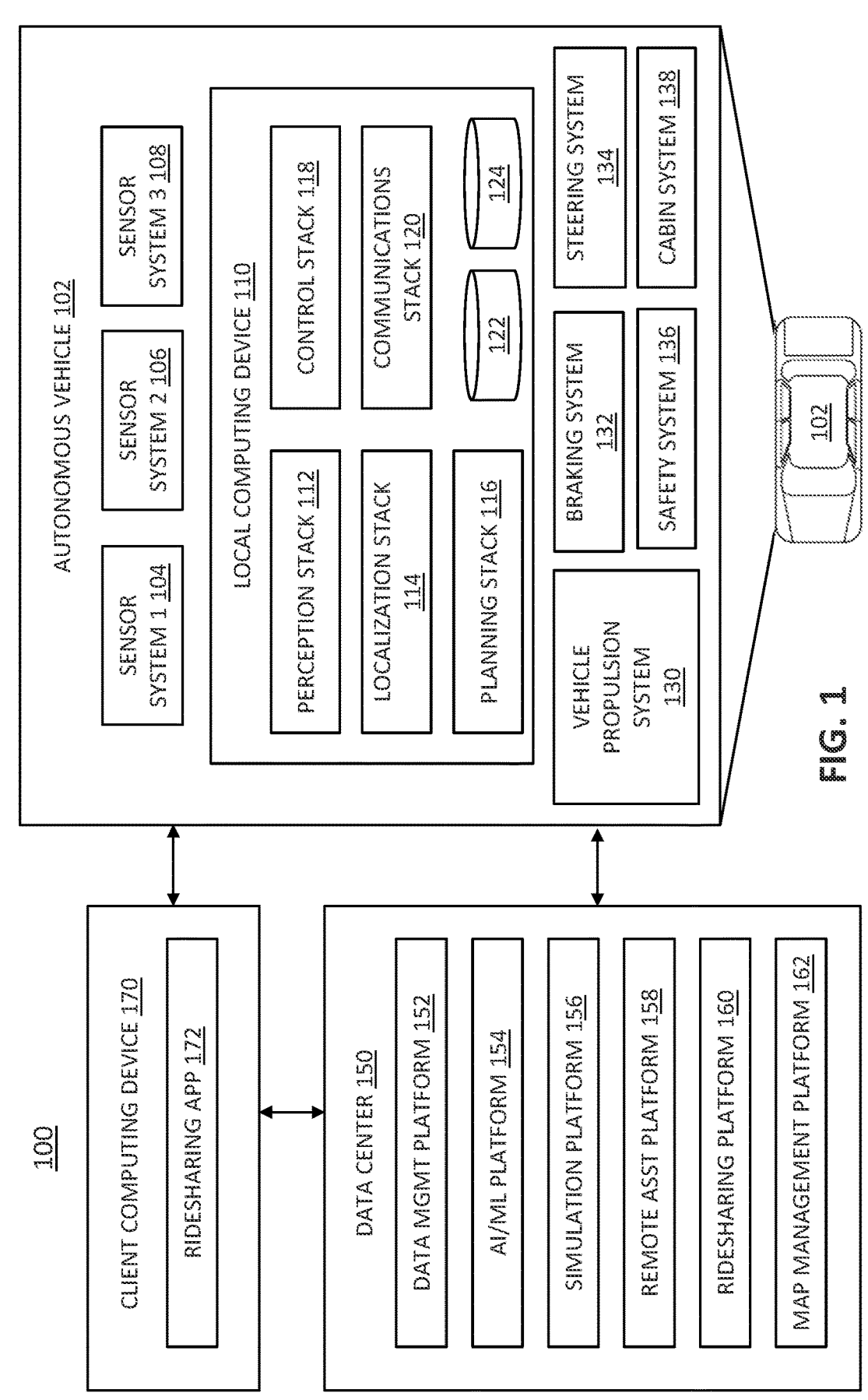
FIG. 1 illustrates an example system environment that can be used to facilitate AV dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (which services may be collectively and/or interchangeably referred to herein simply as "rideshare services" whether for a single user/passenger, multiple users/passengers, and/or one or more items for delivery) provided by AVs, it is anticipated that AV rideshare services will soon become the ubiquitous choice for various user transportation and delivery needs, including but not limited to school commutes, airport transfers, long distance road trips, and grocery and restaurant deliveries, to name a few.

One goal of AV systems is to mimic and/or approximate human driving as closely and as safely as possible. One reason for this is that as AVs share the road with vehicles operated by humans, those human operators, who may or may not be aware of the fact that another vehicle is a driverless AV, will expect certain behaviors from the AV. Causing AVs to operate in a manner similar to vehicles controlled by humans increases safety on the road.

In many AV systems, a labeled semantic map may be consumed by a planning stack of the AV to plan particular maneuvers the AV may need to perform while traversing an identified route. The route may be associated with a reference path (or reference prior, as used herein), which may be defined in the semantic map by default to align with geometric centerlines of various lane segments. Geometric centerlines may be defined by lane boundaries labeled for lane segments. In certain areas, such as areas of high curvature, chicanes, and/or other areas, using geometric centerlines as the default reference path can result in non-human driving behavior.

As used herein, the term "manual driving data (MDD) nominals" (or simply "nominals") refers to a method or pipeline for generating mapped reference priors (or reference paths) for a planning system (or "planning stack") based on actual driving data generated using trained human operators (also referred to as AV technicians (AVTs) or AVT operators (AVTO)). The term "algorithmic nominals" (as opposed to "nominals" or "MDD nominals") refers to a method for augmenting a human-labeled semantic map to generate geometrically optimal and model-consistent reference priors for the planning stack.

As will be described in greater detail below, in certain embodiments, instead of the planning stack using a geometric centerline of a lane (or lane segment or segments) to guide AV driving, manual driving data obtained using trained human AVTs may be filtered and/or aggregated to assign control points (e.g., corner, sharp turn, etc.) to generate updated centerlines (e.g., "MDD nominals" or simply "nominals") for use in guiding AV driving. In accordance with features of particular embodiments, the planning stack of an AV can turn nominals on or off in response to various conditions. For example, nominals may remain off until a density, or amount, of available manual driving data meets or exceeds a predetermined density threshold, after which nominals are turned on (and presumably remain on thereafter). Because MDD nominals rely on AVT-generated data, data for implementing nominals may not be available either at all or in a sufficient density for all portion of a map coverage area (e.g., a city). Still further, the available data cannot be scaled to cover other portions of the map and/or a different coverage area or city.

As a result of the limitations of human nominals, algorithmic nominals, which are derived from references (e.g., geometric centerlines and lane boundaries of lanes/lane segments), may be used instead of and/or supplemental to MDD nominals to augment a labeled semantic map with geometrically optimal planning reference priors. Additionally and/or alternatively, algorithmic nominals may be implemented by application of a smoothing spline, Iterative Linear Quadratic Regulator (ILQR), or Euler Spiral algorithm to geometric centerlines of lane segments as defined in the labeled semantic map and identified as being areas of high curvature or other complex shapes that may require smoothing to emulate more "human-like" driving.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

Figure 10:
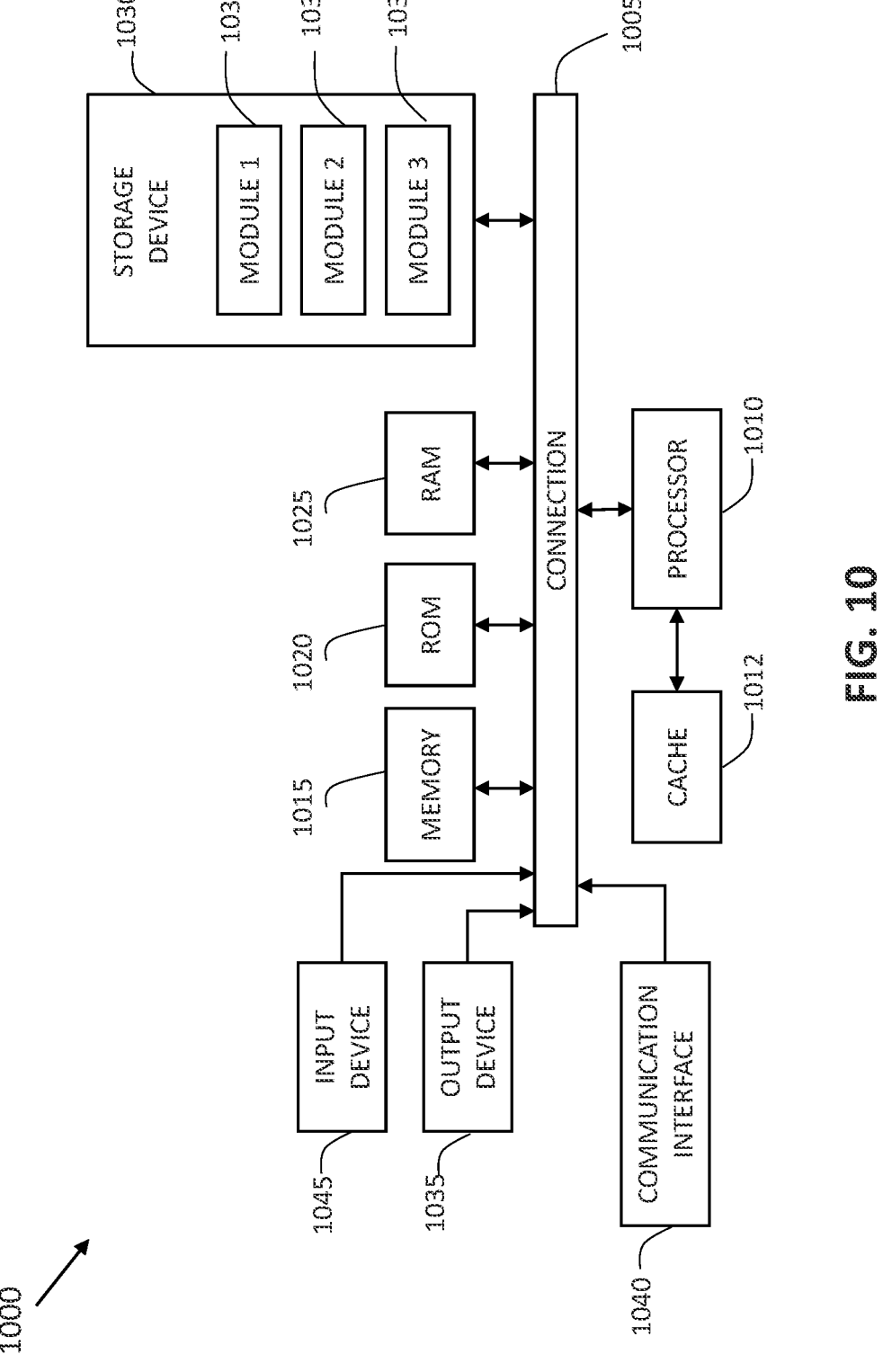
FIG. 10 illustrates an example processor-based system with which some aspects of the disclosed technology can be implemented.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.).

The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth©, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data as discussed further below with respect to FIG. 5 and elsewhere in the present disclosure.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Example Reference Paths for Use by an AV Planning Stack

Figure 2:
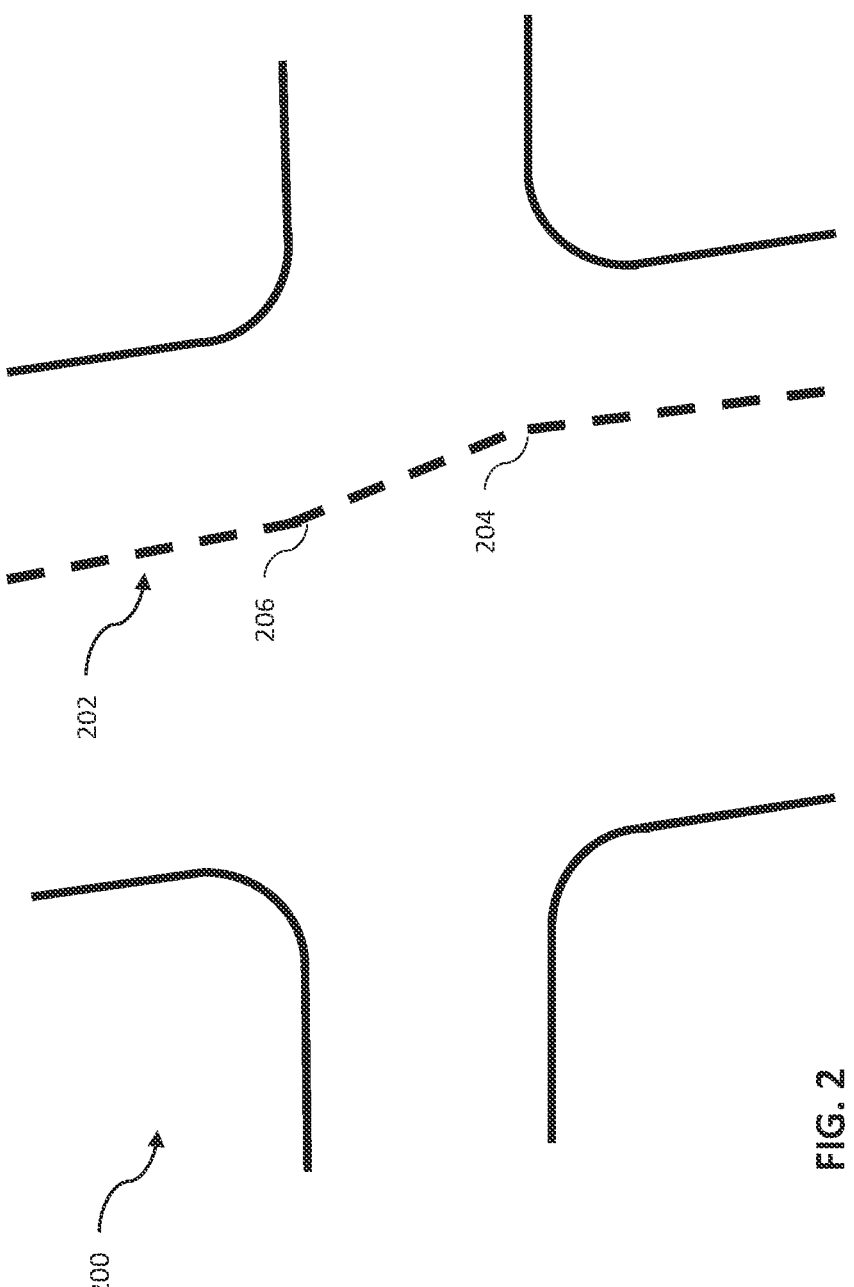
FIGS. 2 and 3 respectively illustrate a geometric centerline of an intersection and a nominal reference path of the same intersection determined, according to some aspects of the disclosed technology.
Figure 3:
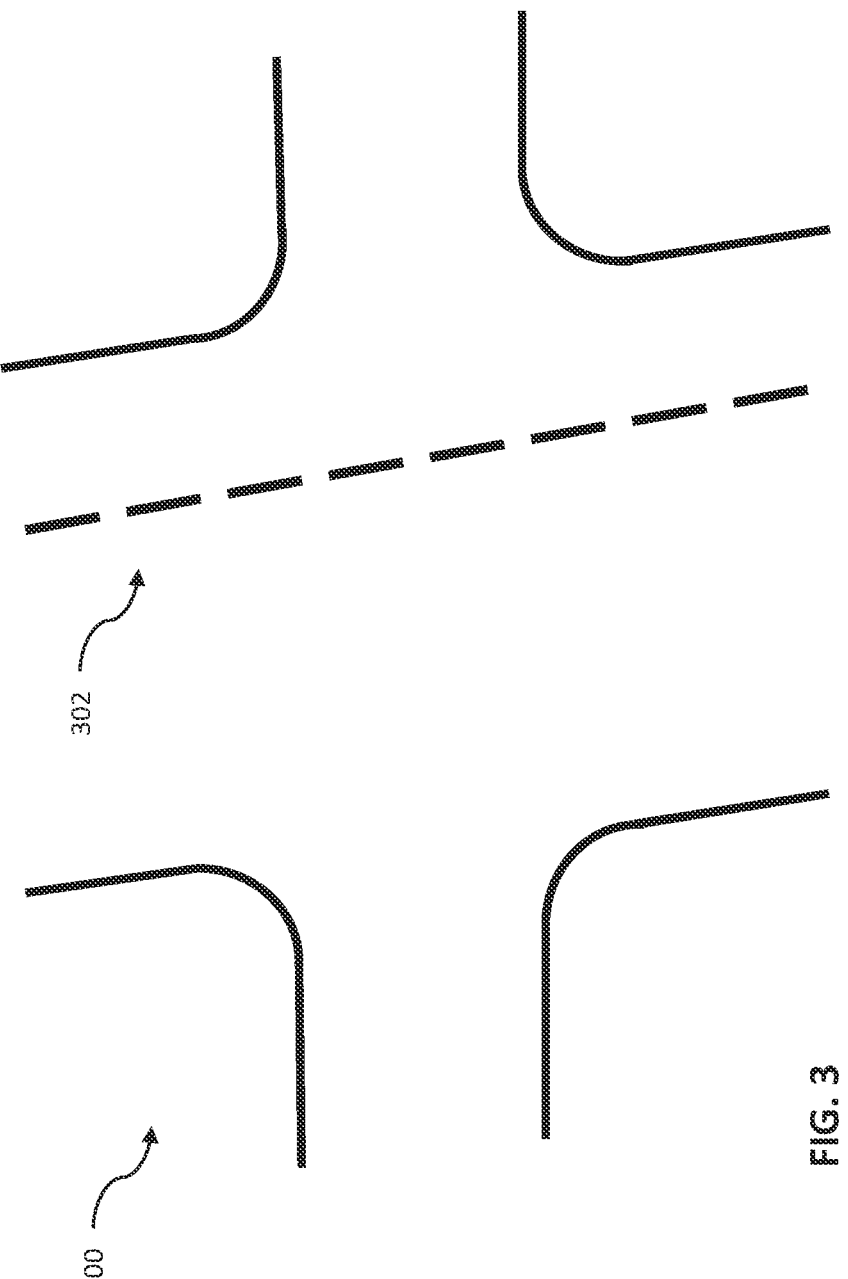

FIGS. 2 and 3 illustrate example reference paths that may be input to an AV planning stack for use in AV motion planning along a route. In particular, FIG. 2 illustrates an intersection 200 and a reference path 202 comprising a geometric centerline that may be defined in the labeled semantic map for one or more lane segments comprising the intersection. As will be noted in FIG. 2, solving against the geometric centerline 202 will result in an AV being caused to drive in a manner that is jerky and not particularly human-like, particularly at points 204 and 206. As previously noted, such non-human driving behavior is to be avoided as potentially causing a safety hazard during operation of the AV on the road.

In comparison, FIG. 3 illustrates a reference path 302 comprising a nominal reference path generated using one of the processes described below for generating a nominal reference path (e.g., from AVT data or using an algorithmic smoothing process). As is clear from a comparison of the paths 202 and 302, the path 302 more closely approximates the path that a human driver would take through the intersection 200. In particular, the jerky movements represented by points 204 and 206 are absent from the path 302 and the path 302 proceeds smoothly through the intersection 200 without the unnecessary and abrupt movements necessitated by the reference path 202.

Figure 4:
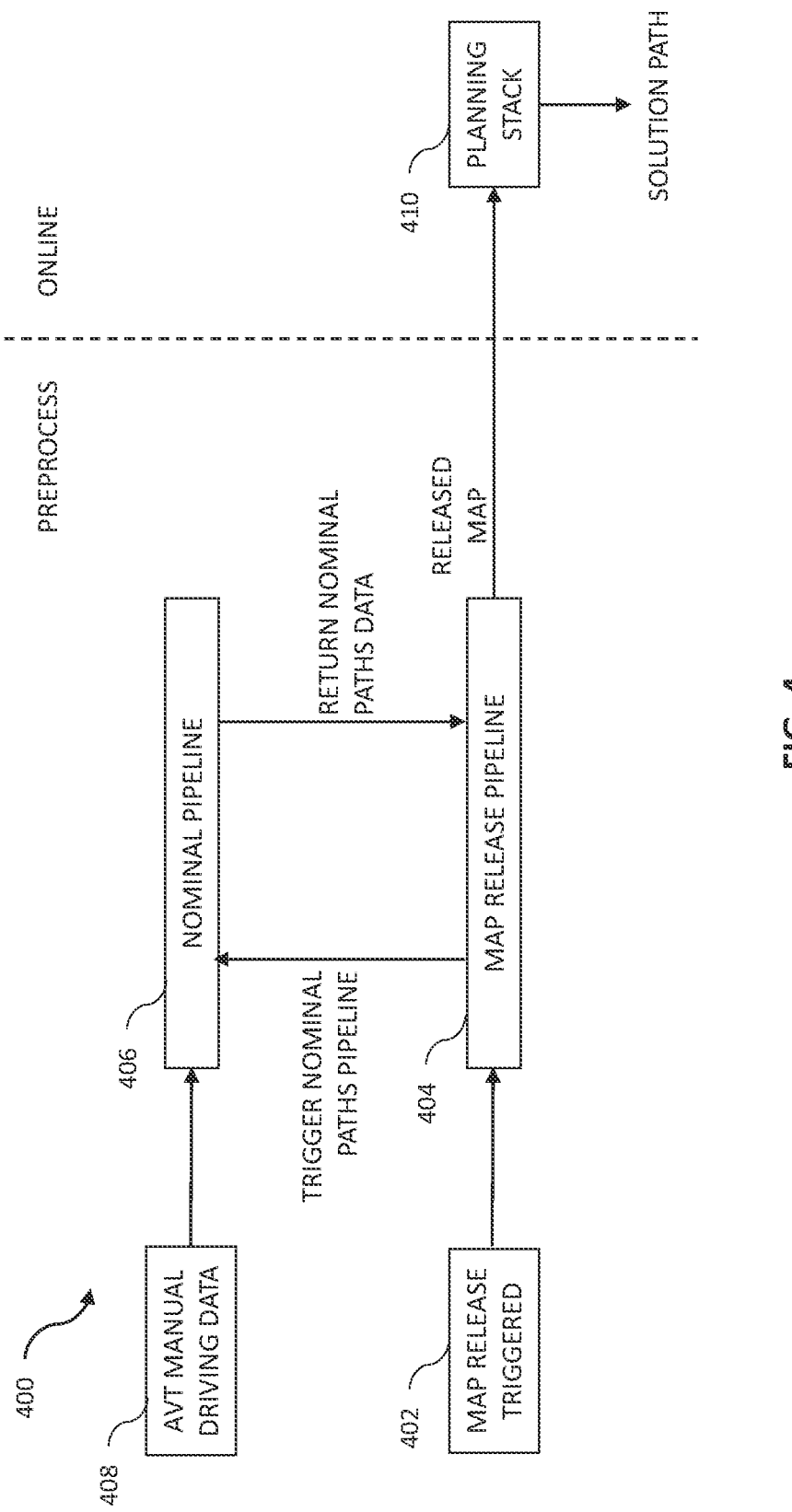
FIG. 4 illustrates a block diagram of an example system for determining nominal reference paths for use by a planning stack of an AV using AV technician (AVT) manual driving data, according to some aspects of the disclosed technology.

Example Techniques for Determining Nominal Reference Paths Using AVT Driving Data FIG. 4 illustrates a block diagram of an example system 400 for producing nominal reference paths comprising a new layer of reference paths in the map for consumption by an AV planning stack using AVT driving data. It will be recognized that a particular advantage of producing nominal reference paths based on AVT driving data is that such driving information may take into account unmapped features (e.g., potholes) that a human driver may maneuver to avoid but that an AV ("knowing" only features labeled in the semantic map input to its planning stack) may not realize to do.

As shown in FIG. 4, when a map release is triggered 402, a map release pipeline 404 triggers a nominal paths pipeline 406. Accumulated AVT manual driving data 408 (which may be produced when for any reason an AVT takes over driving for any AV in a fleet of AVs and which driving data may be stored as spatial coordinates in an appropriate database) is provided to the nominal pipeline 406. The nominal pipeline 406 runs a nominal algorithm (e.g., FIG. 5) to process the AVT manual driving data and develop MDD nominal paths as described in detail below. The nominal pipeline 406 returns nominal paths data to the map release pipeline 404. The map release pipeline 404 integrates the nominal paths data received from the nominal pipeline 406 into the map (or overlays such data on the map) such that the nominal paths data replaces centerline reference paths for lane segments in connection with which nominal paths data is available and generates a map release. The released map is provided to an AV planning stack 410, which solves against the reference paths provided in the released map to provide a solution path to the AV for trajectory control. As illustrated in FIG. 4, the new map release is generated in a preprocessing stage, while the planning stack 410 consumes the released map data online.

Figure 5:
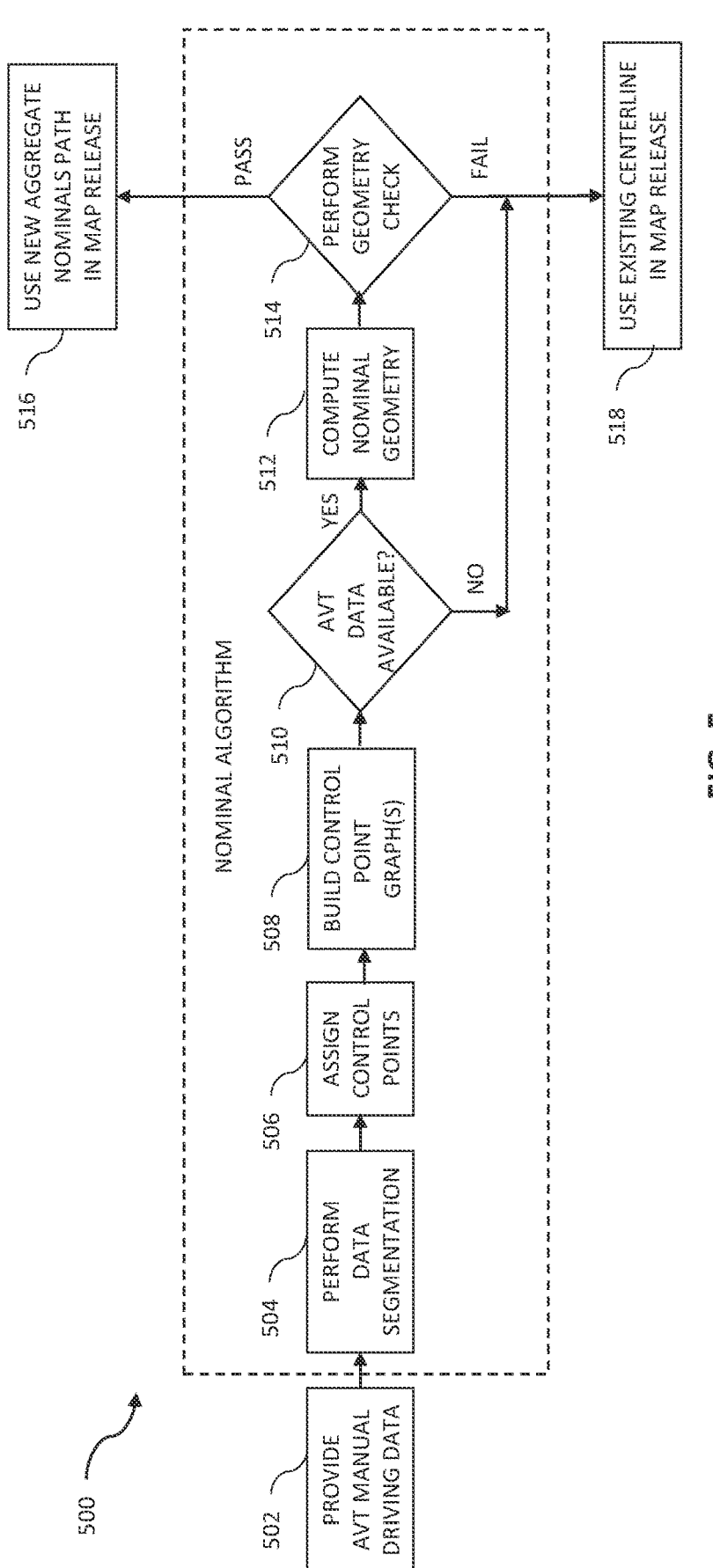
FIG. 5 illustrates a flow diagram of an example nominal algorithm for determining nominal reference paths using AVT manual driving data for use in the example system of FIG. 4, according to some aspects of the disclosed technology.

FIG. 5 illustrates a flow diagram 500 of example operations of an example MDD nominal algorithm for use in the example system 400 (FIG. 4) according to some aspects of the disclosed technology. In certain embodiments, one or more of the operations illustrated in FIG. 5 may be executed by one or more of the elements shown in FIG. 1.

At operation 502, accumulated AVT manual driving data is provided (e.g., from a database) to the nominal algorithm. As previously indicated, AVT manual driving data is acquired and accumulated during periods of time in which one or more AVs of a fleet of AVs are being operated in manual mode; i.e., being driving manually by AVTs throughout a service area (e.g., a city and/or an Operation Design Domain (ODD)) and may comprise spatial coordinates that are not particularly associated with map data.

At operation 504, data segmentation is performed on the AVT manual driving data provided to the nominal algorithm. In particular, the driving data is segmented into lanes. More particularly, in certain embodiments, manual driving data is recorded as a series of spatial coordinates. At operation 504, the spatial coordinates are overlaid on the semantic map and associated with lane segments.

Figure 6:
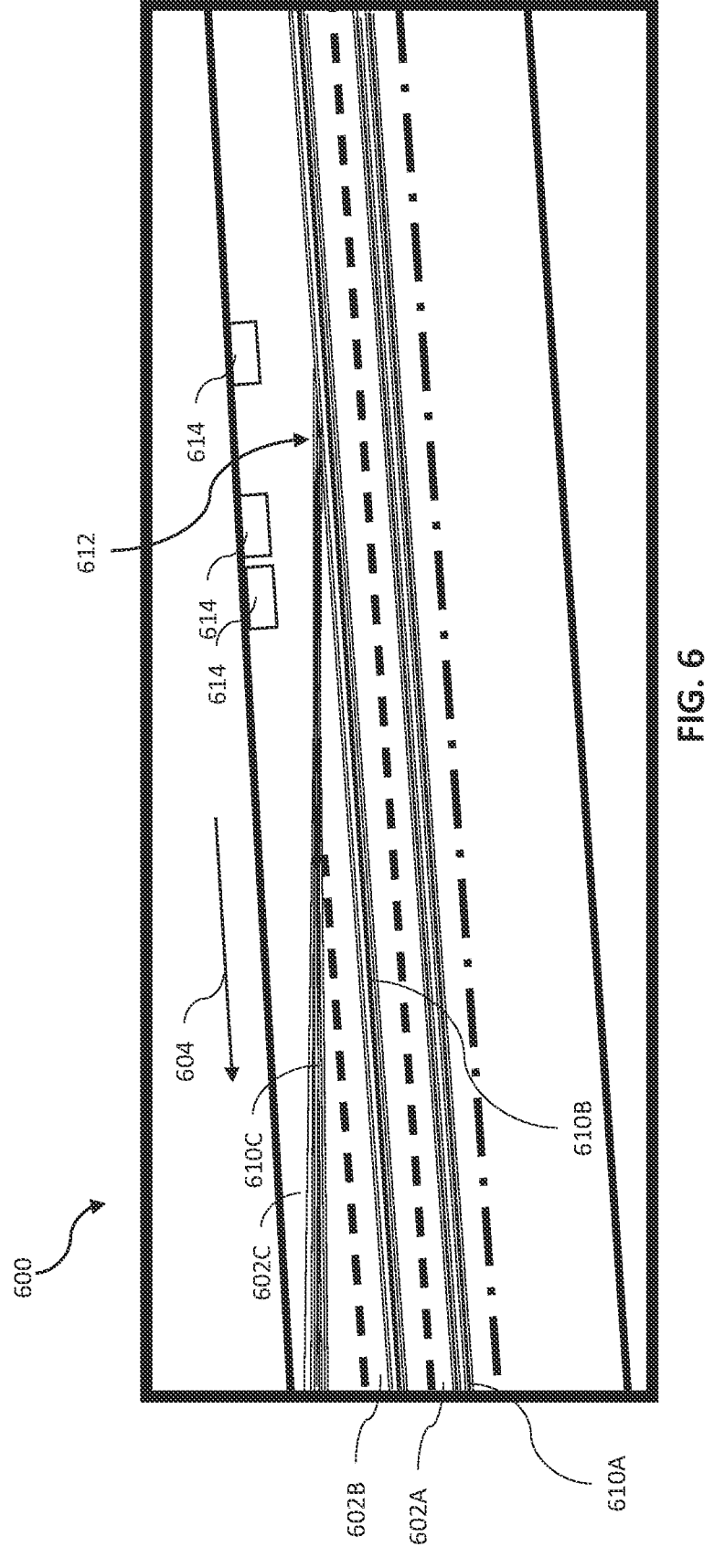
FIGS. 6, 7, and 8A-8B illustrate various aspects of the nominal algorithm for determining nominal reference paths using AVT manual driving data of FIG. 5, according to some embodiments of the disclosed technology.

FIG. 6 illustrates manual (i.e., human) driving data for a portion of a road 600 that may be represented in an AV semantic map and that includes multiple lanes 602A-602C. It will be assumed that traffic on the road portion 600 proceeds in a direction indicated by an arrow 604 and that lane 602C is a right turn lane. Lines 610A-610C represent paths corresponding to manual driving data accumulated for the lanes 602A-602C. As illustrated in FIG. 6, at or about a point 612, just beyond parked cars 614, human drivers wishing to turn right at an upcoming intersection (not explicitly shown in FIG. 6) ease their vehicles from the lane 602B into the lane 602C. It may be observed that this manual vehicular movement is relatively smooth and occurs over a period of time rather than being an abrupt, angular movement.

Returning to FIG. 5, at operation 506, control points are assigned to lane segments. In a particular embodiment, control points may be positioned on geometric centerlines of lane segments. Alternatively, control points may be positioned in other locations along a lane segment depending on other geometric elements of the lane segment. Control points may be spaced as necessary or desirable along a lane segment to enable a reference path to be generated that mimics human driving. One or more control points may be associated with each lane segment as appropriate. In general, the one or more control points are positioned in the lane segment in a manner (i.e., in a location relative to the geometry of the lane segment as well as a location relative to other control points, if other control points exist, in a manner that accurately characterizes the lane segment.

At operation 508, a control point graph comprising nodes (control points) and edges (connections between control points) is created.

Figure 7:
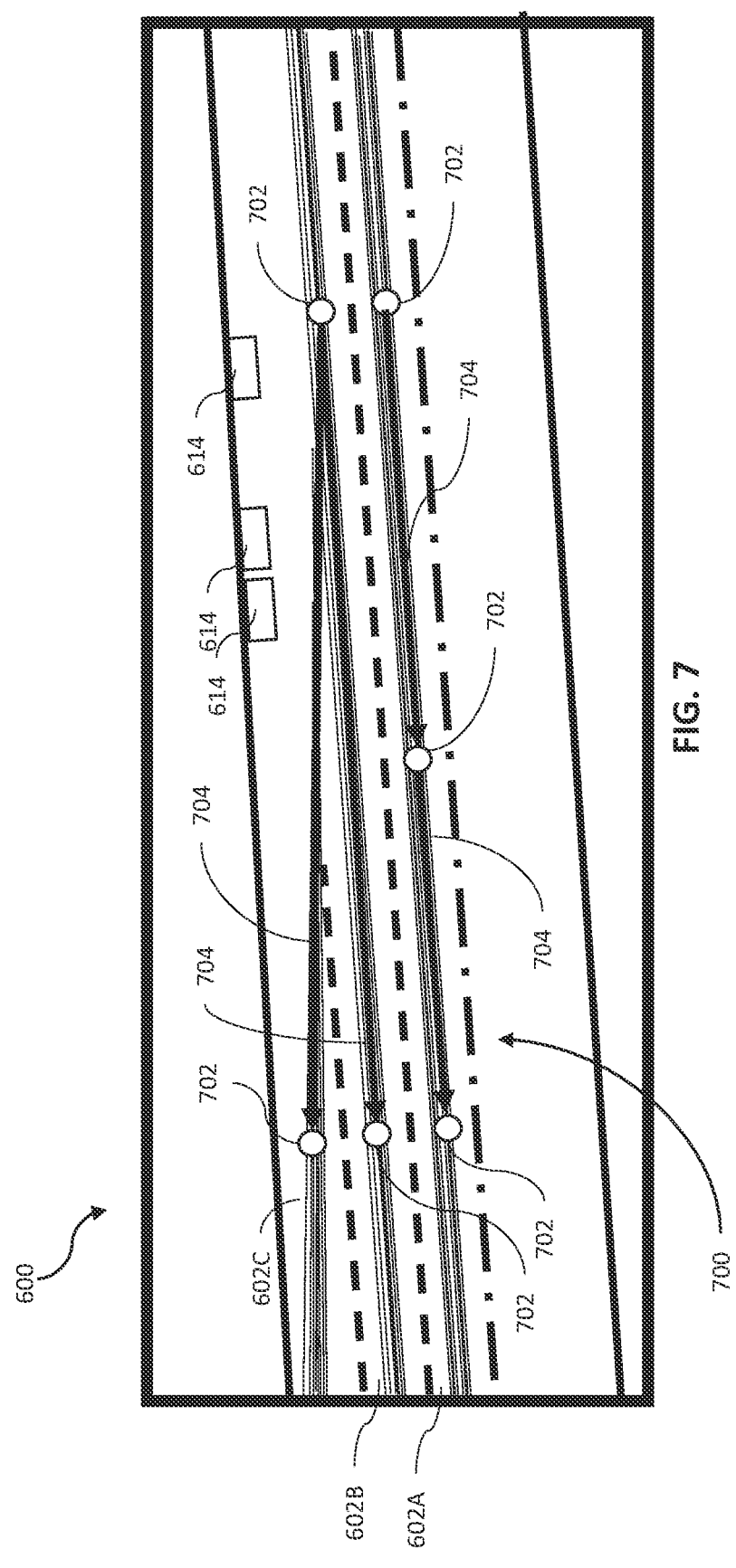

FIG. 7 illustrates a control point graph 700 including a plurality of control points 702 and edges 704 connecting control points.

At operation 510, a determination is made whether manual driving data exists for lane segments associated with edges. It will be recognized that manual driving data may only be considered (and in fact may only be useful) if it extends from one control point to the next, thereby to rule out situations in which an AVT pulled the AV over in between control points and/or reversed course between control points. Driving data that does not meet this condition will be discarded. If a positive determination is made in 510, execution proceeds to 512.

At operation 512, nominal geometry is computed. In particular, the manual driving data for a segment is filtered and averaged to determine a nominal reference path for the segment. Averaging may be performed, for example, by normalizing data for the segment using linear interpolation. If metadata (e.g., traffic, time of day, time of year, etc.) is available for the manual driving data, such metadata may be used to weight the manual driving data for the segment before the data is averaged. In alternative embodiments, the driving data is averaged to determine a nominal reference path for the segment.

At operation 514, a series of geometric checks are performed on the nominal reference path produced at operation 512. Examples of geometric checks include removal of duplicate points, curvature constraints, and lane boundary containment. If the nominal reference path produced at operation 512 passes the geometry check, execution proceeds to operation 516.

Figure 8A:
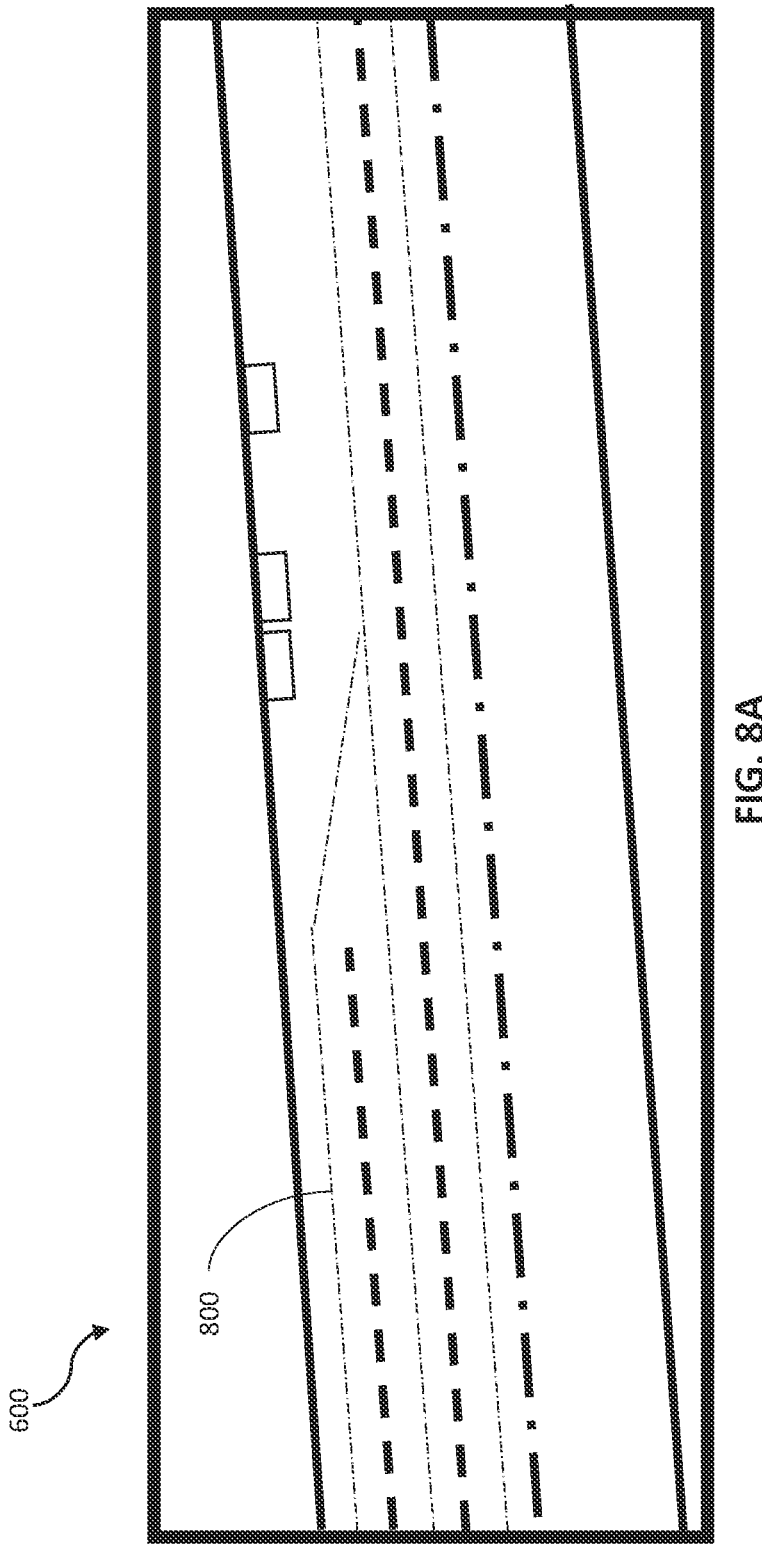

At operation 516, the new aggregate nominal reference path is mapped to lane IDs and output with the new map release. FIG. 8A illustrates a representative new aggregate nominal reference path 800 for the road portion 600. As described in greater detail below, the new aggregate nominal reference path 800 is smoother than the reference path 850 and more closely mimics a path that might be taken by a human driver along the same route.

Figure 8B:
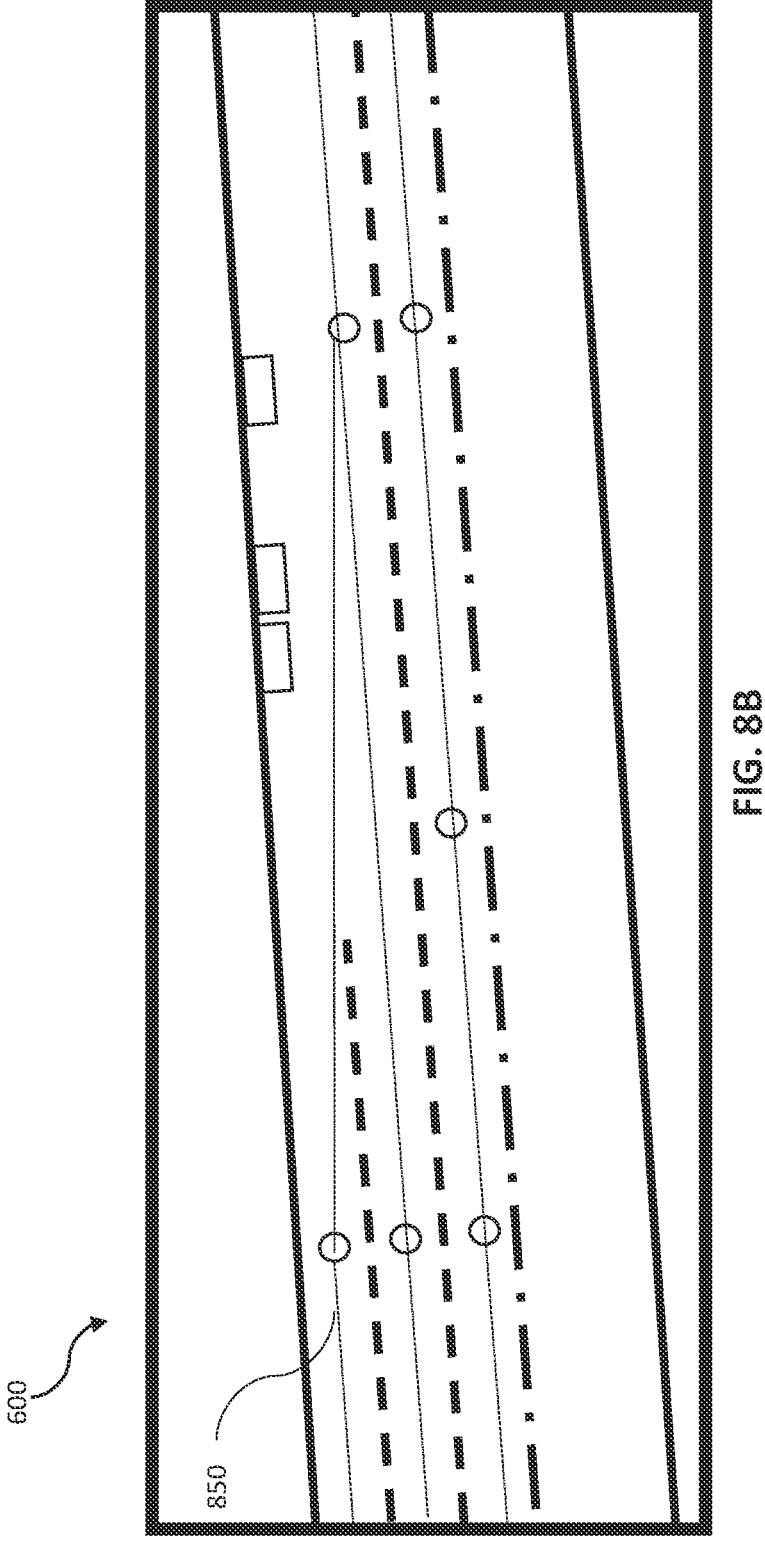

If at operation 510, it is determined that manual driving data is not available or if at operation 514, the geometry check is not passed, at operation step 518, the existing centerline reference path is used in the map release. FIG. 8B illustrates an existing centerline path 850 for the road portion 600. It will be noted that the reference path 800 may more closely mimics a path a human driver would take in moving into a turn lane than does the reference path 850. For example, the reference path 850 includes sharp corners/turns which translate into jerky movement of the AV. These jerky movements are smoothed by the reference path 800 in the same way that a human driver would be more likely to gradually move the steering wheel (e.g., to merge into traffic) than to turn it abruptly from a first position to a second position.

Although the operations of the example method shown in FIG. 8 are illustrated as occurring once each and in a particular order, it will be recognized that the operations may be performed in any suitable order and repeated as desired. Additionally, one or more operations may be performed in parallel. Furthermore, the operations illustrated in FIG. 5 may be combined or may include more or fewer details than described.

Example Techniques for Algorithmically Determining Nominal Reference Paths

As previously noted, there will be areas of a map for which AVT driving data is not available in sufficient quantities to render a nominal reference path determined using the above-noted process reliable or useful. Additionally, the process is not scalable, in that the AVT driving data is associated with a particular lane segment and cannot be generalized to other lane segments and/or map segments or other coverage areas (e.g., cities). In situations in which human nominals described above cannot be generated, algorithmic nominals may be useful to augment or supplant human nominals derived from AVT driving data.

FIG. 9 is a flowchart 900 illustrating example operations for algorithmically determining nominal reference paths for use by a planning stack of an AV using labeled semantic map data according to some aspects of the disclosed technology. In certain embodiments, one or more of the operations illustrated in FIG. 9 may be executed by one or more of the elements shown in FIG. 1.

At operation 902, a labeled semantic map is filtered to identify lane segments that include areas of high curvature, intersections, and/or known chicanes. In other words, the labeled semantic map is filtered to determine areas in which reference paths comprising geometric centerlines result in driving behavior that may be particularly non-human (e.g., unnecessarily angular and/or jerky).

At operation 904, a smoothing algorithm is applied to the geometric centerlines, lane boundaries, and/or control points of identified lane segments to generate an algorithmic nominal reference path. In some embodiments, a Euler Spiral or other clothoid can be applied to an identified area to "smooth" a reference path corresponding to the geometric centerline of one or more lane segments. In other embodiments, the smoothing function could be performed by applying a nonlinear solver, such as ILQR, to the centerline reference path.

At operation 906, the geometric centerline-based reference path is replaced with the algorithmic nominal reference path for input to and consumption by the planning stack for planning AV movement.

Although the operations of the example method shown in FIG. 9 are illustrated as occurring once each and in a particular order, it will be recognized that the operations may be performed in any suitable order and repeated as desired. Additionally, one or more operations may be performed in parallel. Furthermore, the operations illustrated in FIG. 9 may be combined or may include more or fewer details than described.

It will be recognized that, in certain embodiments, both the nominals solution and the algorithmic nominals solution could be used in conjunction with one another, with the algorithmic nominal reference path being determined and deployed when there is insufficient manual driving data for a particular lane segment comprising an area of high curvature, for example. In other embodiments, only one or the other solution may be applied.

Example Processor-Based System

FIG. 10 illustrates an example processor-based system with which some aspects of the subject technology can be implemented. For example, processor-based system 1000 can be any computing device making up, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (Central Processing Unit (CPU) or processor) 1010 and connection 1005 that couples various system components including system memory 1015, such as Read-Only Memory (ROM) 1020 and Random-Access Memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1040 may also include one or more GNSS receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1030 can include software services, servers, services, etc., that when the code that defines such software is executed by the processor 1010, it causes the system 1000 to perform a function. In some embodiments, a hardware service that performs a particular function can include the software component stored in a computer-readable medium in connection with the necessary hardware components, such as processor 1010, connection 1005, output device 1035, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a method for providing a reference prior for a portion of a route to a planning stack of a vehicle, the method comprising accessing manual driving data associated with the route portion, the manual driving data stored in a database; averaging the accessed manual driving data to determine a nominal path for the route portion; and providing the nominal path to the planning stack of the vehicle as the reference prior for the route portion, wherein the planning stack consumes the reference prior for planning maneuvers of the vehicle in traversing the route portion.

Example 2 provides the method of example 1, further comprising, prior to the averaging, determining whether the accessed manual driving data exceeds a predetermined confidence threshold.

Example 3 provides the method of example 2, wherein the predetermined confidence threshold is a measure of a quality of the accessed manual driving data.

Example 4 provides the method of any of examples 2-3, wherein the predetermined confidence threshold is a measure of a quantity of the accessed manual driving data.

Example 5 provides the method of any of examples 2-4, further comprising, if the accessed manual driving data fails to exceed the predetermined confidence threshold, refraining from providing the nominal path to the planning stack of the vehicle as the reference prior for the route portion and instead providing a geometric centerline of the route portion to the planning stack of the vehicle as the reference prior for the route portion.

Example 6 provides the method of example 5, wherein the geometric centerline is defined in a semantic map associated with the vehicle.

Example 7 provides the method of any of examples 1-6, wherein the vehicle comprises an autonomous vehicle.

Example 8 provides the method of any of examples 1-7, further comprising performing a geometry check on the nominal path prior to the providing the nominal path to the planning stack; and, if the nominal path fails the geometry check, refraining from providing the nominal path to the planning stack of the vehicle as the reference prior for the route portion and instead providing a geometric centerline of the route portion to the planning stack of the vehicle as the reference prior for the route portion.

Example 9 provides the method of example 8, wherein the reference prior for the route portion is included in a semantic map release to the planning stack.

Example 10 provides the method of any of examples 1-9, further comprising aggregating multiple sets of manual driving data for the route portion prior to the averaging, wherein each of the sets of manual driving data corresponds to a traversal of the route portion by an autonomous vehicle manually operated by a human.

Example 11 provides a method for generating reference paths for lane segments for consumption by a planning stack of a vehicle, the method comprising filtering a labeled semantic map to identify lane segments that meet a specified condition; and, for each of the identified lane segments applying a smoothing algorithm to one or more of a geometric centerline for the identified lane segment, lane boundaries of the identified lane segment, and control points assigned to the identified lane segment to generate an algorithmic nominal path for the identified lane segment; and replacing the geometric centerline for the identified lane segment in the labeled semantic map with the algorithmic nominal path for the identified segment.

Example 12 provides the method of example 11, wherein the smoothing algorithm comprises a Euler spiral algorithm.

Example 13 provides the method of any of examples 11-12, wherein the smoothing algorithm comprises an Iterative Linear Quadratic Regulator (ILQR).

Example 14 provides the method of any of examples 11-13, wherein the vehicle comprises an autonomous vehicle.

Example 15 provides the method of any of examples 11-14, wherein the specified condition comprises one of a chicane, an area of high curvature, and an intersection.

Example 16 provides a method for generating reference paths for lane segments for consumption by a planning stack of a vehicle, the method comprising filtering a labeled semantic map to identify lane segments that meet a specified condition; and, for each of the identified lane segments determining whether manual driving data associated with the identified lane segment exists in a database; if manual driving data associated with the identified lane segment exists, averaging the manual driving data to determine a human nominal path for the route portion; and providing the manual driving data nominal path to the planning stack of the vehicle as the reference path for the identified lane segment; and, if manual driving data associated with the identified lane segment does not exist, applying a smoothing algorithm to one or more of a geometric centerline for the identified lane segment, lane boundaries of the identified lane segment, and control points assigned to the identified lane segment to generate an algorithmic nominal path for the identified lane segment; and providing the manual driving data nominal path to the planning stack of the vehicle as the reference path for the identified lane segment.

Example 17 provides the method of example 16, further comprising, prior to the averaging, determining whether the manual driving data exceeds a predetermined confidence threshold; and if the accessed manual driving data fails to exceed the predetermined confidence threshold, refraining from providing the human nominal path to the planning stack of the vehicle as the reference prior for the identified route.

Example 18 provides the method of any of examples 16-17, wherein the smoothing algorithm comprises a Euler spiral algorithm.

Example 19 provides the method of any of examples 16-18, wherein the smoothing algorithm comprises an Iterative Linear Quadratic Regulator (ILQR).

Example 20 provides the method of any of examples 16-19, wherein the vehicle comprises an autonomous vehicle.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method for providing a reference prior for a route portion to a planning stack of a vehicle, the method comprising:

creating a control point graph for the route portion, the control point graph comprising a plurality of control points connected by edges;

accessing manual driving data associated with the route portion, the manual driving data comprising a series of spatial coordinates generated by a sensor suite of the vehicle during manual operation, the sensor suite including a LIDAR system, and stored in a database;

overlaying the series of spatial coordinates onto a semantic map to associate the accessed manual driving data with the edges of the control point graph;

averaging the accessed manual driving data associated with the edges to determine a nominal path for the route portion;

integrating the nominal path into the semantic map as a new layer of reference paths to generate a map release; and transmitting, from a remote data center to the vehicle over a wireless network, the generated map release to the planning stack of the vehicle, wherein the planning stack consumes the nominal path from the new layer of the reference paths to generate actuator commands for controlling at least one of a steering system or a propulsion system of the vehicle for planning maneuvers of the vehicle in traversing the route portion.

2. The method of claim 1, further comprising, prior to the averaging, determining whether the accessed manual driving data exceeds a predetermined confidence threshold.

3. The method of claim 2, wherein the predetermined confidence threshold is a measure of a quality of the accessed manual driving data.

4. The method of claim 2, wherein the predetermined confidence threshold is a measure of a quantity of the accessed manual driving data.

5. The method of claim 2, further comprising, based on determining that the accessed manual driving data fails to exceed the predetermined confidence threshold, refraining from integrating the nominal path into the semantic map and instead providing a geometric centerline of the route portion to the planning stack of the vehicle as the reference prior for the route portion.

6. The method of claim 5, wherein the geometric centerline is defined in the semantic map.

7. The method of claim 1, wherein the vehicle comprises an autonomous vehicle.

8. The method of claim 1, further comprising:

performing a geometry check on the nominal path prior to integrating the nominal path into the semantic map; and based on determining the nominal path fails the geometry check, refraining from integrating the nominal path into the semantic map and instead providing a geometric centerline of the route portion to the planning stack of the vehicle as the reference prior for the route portion.

9. The method of claim 1, further comprising aggregating multiple sets of manual driving data for the route portion prior to the averaging, wherein each of the sets of manual driving data corresponds to a traversal of the route portion by an autonomous vehicle manually operated by a human.

\* \* \* \* \*